United States Patent
Kim

(10) Patent No.: US 12,306,753 B2
(45) Date of Patent: May 20, 2025

(54) APPARATUS AND METHOD WITH CACHE CONTROL

(71) Applicant: SAMSUNG ELECTRONICS CO., LTD., Suwon-si (KR)

(72) Inventor: Ho Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 17/867,142

(22) Filed: Jul. 18, 2022

(65) Prior Publication Data

US 2023/0161701 A1    May 25, 2023

(30) Foreign Application Priority Data

Nov. 23, 2021  (KR) .................. 10-2021-0162587

(51) Int. Cl.
| | |
|---|---|
| *G06F 12/0802* | (2016.01) |
| *G06F 12/0811* | (2016.01) |
| *G06F 12/0842* | (2016.01) |
| *G06F 12/0846* | (2016.01) |
| *G06F 12/0862* | (2016.01) |
| *G06F 12/0871* | (2016.01) |
| *G06F 12/0875* | (2016.01) |
| *G06F 12/0897* | (2016.01) |
| *G06N 3/02* | (2006.01) |

(52) U.S. Cl.
CPC ...... *G06F 12/0802* (2013.01); *G06F 2212/60* (2013.01)

(58) Field of Classification Search
CPC .................... G06F 12/0802; G06F 2212/60

USPC ......................................................... 711/207
See application file for complete search history.

(56) References Cited

U.S. PATENT DOCUMENTS

| | | | |
|---|---|---|---|
| 6,681,297 B2 | 1/2004 | Chauvel et al. | |
| 8,782,653 B2 | 7/2014 | Gibson et al. | |
| 9,158,355 B2 | 10/2015 | Sutardja et al. | |
| 2004/0215887 A1* | 10/2004 | Starke | G06F 12/127 |
| | | | 711/E12.072 |
| 2007/0136726 A1 | 6/2007 | Freeland et al. | |
| 2008/0005473 A1* | 1/2008 | Chen | G06F 12/0802 |
| | | | 711/E12.017 |

(Continued)

FOREIGN PATENT DOCUMENTS

JP    4989872 B2    8/2012

OTHER PUBLICATIONS

Microsoft Computer Dictionary, 2002, Microsoft Press, fifth edition (Year: 2002).*

(Continued)

*Primary Examiner* — Arpan P. Savla
*Assistant Examiner* — Sidney Li
(74) *Attorney, Agent, or Firm* — NSIP Law

(57) ABSTRACT

A computing apparatus is provided. The computing apparatus is configured to receive control information from a host device to control a cache area, generate a cache configuration based on the received control information, determine a first cache area and a second cache area in a memory in the computing apparatus based on the generated cache configuration, cache one or more instructions to the first cache area and cache data to the second cache area, and process a thread based on the one or more cached instructions and the cached data.

15 Claims, 12 Drawing Sheets

(56) References Cited

U.S. PATENT DOCUMENTS

| | | | |
|---|---|---|---|
| 2008/0137455 A1* | 6/2008 | Ehrenreich | G11C 29/50 365/201 |
| 2010/0214936 A1* | 8/2010 | Ito | G06N 3/045 370/252 |
| 2010/0228941 A1* | 9/2010 | Koob | G06F 12/0895 711/212 |
| 2010/0332761 A1 | 12/2010 | Li | |
| 2011/0185125 A1* | 7/2011 | Jain | G06F 12/0811 711/E12.024 |
| 2012/0124295 A1* | 5/2012 | Humlicek | G06F 12/0646 711/170 |
| 2013/0304994 A1 | 11/2013 | Koob et al. | |
| 2015/0089142 A1* | 3/2015 | Parks | G06F 12/0875 711/125 |
| 2017/0103022 A1* | 4/2017 | Kreinin | G06F 9/3824 |
| 2019/0361808 A1* | 11/2019 | Subramanian | G06F 12/0802 |
| 2021/0191861 A1 | 6/2021 | Dalmatov | |
| 2022/0100655 A1* | 3/2022 | Seningen | G06F 12/1045 |

OTHER PUBLICATIONS

Extended European search report issued on Apr. 20, 2023, in counterpart European Patent Application No. 22199094.8 (9 pages in English).

* cited by examiner

510

| | Cache size ratio | Number of first stalls | Number of second stalls |
|---|---|---|---|
| Cache configuration 1-1 | | | |
| Cache configuration 2-1 | | | |
| ⋮ | | | |
| Cache configuration k-1 | | | |

FIG. 5A

|  | Cache size ratio | First cache miss ratio (or first cache hit ratio) | Second cache miss ratio (or second cache hit ratio) |
|---|---|---|---|
| Cache configuration 1-1 | | | |
| Cache configuration 2-1 | | | |
| ⋮ | | | |
| Cache configuration k-1 | | | |

APPARATUS AND METHOD WITH CACHE CONTROL

CROSS-REFERENCE TO RELATED APPLICATION

This application claims the benefit under 35 USC § 119(a) of Korean Patent Application No. 10-2021-0162587, filed on Nov. 23, 2021, in the Korean Intellectual Property Office, the entire disclosure of which is incorporated herein by reference for all purposes.

BACKGROUND

1. Field

The following description relates to a method and apparatus with cache control.

2. Description of Related Art

Level one cache (or L1 cache) may be classified into an instruction cache and a data cache. The data cache may have a greater load than the instruction cache or the instruction cache may have a greater load than the data cache based on the characteristics of an executed application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes receiving control information for controlling a cache area from a host device; generating a cache configuration based on the received control information; determining a first cache area and a second cache area in a memory in the processor based on the generated cache configuration; caching one or more instructions stored in an external memory of the processor to the first cache area and caching data stored in the external memory to the second cache area; and processing a thread based on the one or more cached instructions and the cached data.

The control information may include an instruction size and a data size related to the thread, and which are identified by a compiler in the host device, wherein the generating of the cache configuration includes: selecting a first cache size based on the instruction size and selecting a second cache size based on the data size; and generating the cache configuration based on the selected first cache size and the selected second cache size.

The selecting of the first cache area and the selecting of the second cache area may include: selecting the first cache area and selecting the second cache area based on the selected first cache size and the selected second cache size.

The method may include generating a cache performance profile based on a result of the processing of the thread; modifying the generated cache configuration based on the generated cache performance profile; and applying the modified cache configuration to the first cache area and the second cache area.

The generated cache configuration may include a first cache size that is representative of a size of the first cache area and a second cache size that is representative of a size of the second cache area, wherein the modifying of the generated cache configuration may include modifying the first cache size and modifying the second cache size such that a total number of first stalls due to a cache miss of the first cache area and a total number of second stalls due to a cache miss of the second cache area are balanced.

The modifying of the first cache size and the modifying of the second cache size may include increasing the first cache size and decreasing the second cache size in response to the total number of first stalls being greater than the total number of second stalls; and increasing the second cache size and decreasing the first cache size in response to the total number of second stalls being greater than the total number of first stalls.

The method may include generating a cache performance profile based on a result of the processing of the thread; determining an optimized ratio between a size of the first cache area and a size of the second cache area based on the generated cache performance profile in response to each of the generated cache performance profiles and each thread after the thread is processed; and applying the determined optimized ratio to the first cache area and the second cache area.

The receiving comprises receiving, from the host device, an instruction size and a data size inferred from an input given by a neural network model in the host device.

The memory may include static random-access memory (SRAM), the first cache area corresponds to an instruction cache, and the second cache area corresponds to a data cache, and the selecting of the first cache area and the second cache area includes determining representative sizes of the first cache area and the second cache area.

In a general aspect, a processor-implemented method includes determining a cache configuration based on a first cache performance profile for a first cache area and a second cache area in a memory; adjusting, based on the determined cache configuration, the first cache area and the second cache area; caching one or more instructions to the adjusted first cache area and caching data to the adjusted second cache area; and processing a thread based on the one or more cached instructions and the cached data.

The method may include generating a second cache performance profile different from the first cache performance profile based on a result of processing the thread; modifying the determined cache configuration based on the second cache performance profile; and applying the modified cache configuration to the first cache area and the second cache area.

The modifying of the determined cache configuration may include modifying a size of the adjusted first cache area and a size of the adjusted second cache area such that a total number of first stalls due to a cache miss of the first cache area and a total number of second stalls due to a cache miss of the second cache area are balanced.

The method may include selecting the first cache area and the second cache area based on a generated cache profile corresponding to control information received from a host.

In a general aspect, a computing apparatus includes a memory; a cache controller configured to: receive control information for controlling a cache area from a host device, generate a cache configuration based on the control information, and determine a first cache area and a second cache area in the memory based on the generated cache configuration; a fetcher configured to fetch one or more instructions cached in the first cache area and decode the one or more fetched instructions; and a first circuit configured to perform an operation on the cached data in the second cache area and process the thread based on the one or more decoded instructions.

The control information may include an instruction size and a data size related to the thread and identified by a compiler in the host device, wherein the cache controller is configured to determine a first cache size based on the instruction size and determine a second cache size based on the data size and generate the cache configuration based on the determined first cache size and the determined second cache size.

The cache controller may be configured to select the first cache area and select the second cache area based on the selected first cache size and the selected second cache size.

The apparatus may include a profiler configured to generate a cache performance profile based on a result of processing the thread, wherein the cache controller is configured to modify the generated cache configuration based on the generated cache performance profile and apply the modified cache configuration to the first cache area and the second cache area.

The generated cache configuration may include a first cache size that is representative of a size of the first cache area and a second cache size that is representative of a size of the second cache area, wherein the cache controller may be configured to modify the first cache size and the second cache size such that a total number of first stalls due to a cache miss of the first cache area and a total number of second stalls due to a cache miss of the second cache area are balanced.

The cache controller may be configured to increase the first cache size and decrease the second cache size in response to the total number of first stalls being greater than the total number of second stalls, and increase the second cache size and decrease the first cache size in response to the total number of second stalls being greater than the total number of first stalls.

The cache controller may be configured to determine an optimized ratio between a size of the first cache area and a size of the second cache area based on the generated cache performance profile in response to each of the generated cache performance profiles and each thread after the thread is processed and apply the determined optimized ratio to the first cache area and the second cache area.

The cache controller may be configured to receive, from the host device, an instruction size and a data size inferred from an input given by a neural network model in the host device.

The memory may include static random-access memory (SRAM), the first cache area corresponds to an instruction cache, and the second cache area corresponds to a data cache.

In a general aspect, an electronic apparatus includes a plurality of processors, wherein each of the plurality of processors is configured to: receive control information for controlling a cache area from a host device, generate a cache configuration based on the control information, determine a first cache area and a second cache area in a memory in each of the processors based on the generated cache configuration, cache one or more instructions to the first cache area and cache data to the second cache area, and process a thread based on the one or more cached instructions and the cached data.

Each of the plurality of processors may be configured to: generate a cache performance profile based on a result of processing the thread, modify each of the generated cache configurations with each of the generated cache performance profiles, and apply each of the modified cache configurations to the first cache area and the second cache area.

In a general aspect, as electronic apparatus includes a plurality of processors; a first controller configured to generate respective cache configurations based on control information received from a host device to control a cache, and transmit each of the respective cache configurations to a different processor of each of the plurality of processors, wherein the plurality of processors are each configured to: select a first cache area and select a second cache area in a memory in each of the processors based on each of the received cache configuration, cache one or more instructions to the first cache area and data to the second cache area, and process respective threads based on the one or more cached instructions and cached data.

Other features and aspects will be apparent from the following detailed description, the drawings, and the claims.

BRIEF DESCRIPTION OF DRAWINGS

FIG. 5A and FIG. 5B illustrate an example processor determining an optimized cache size ratio, in accordance with one or more embodiments.

Figure 1:
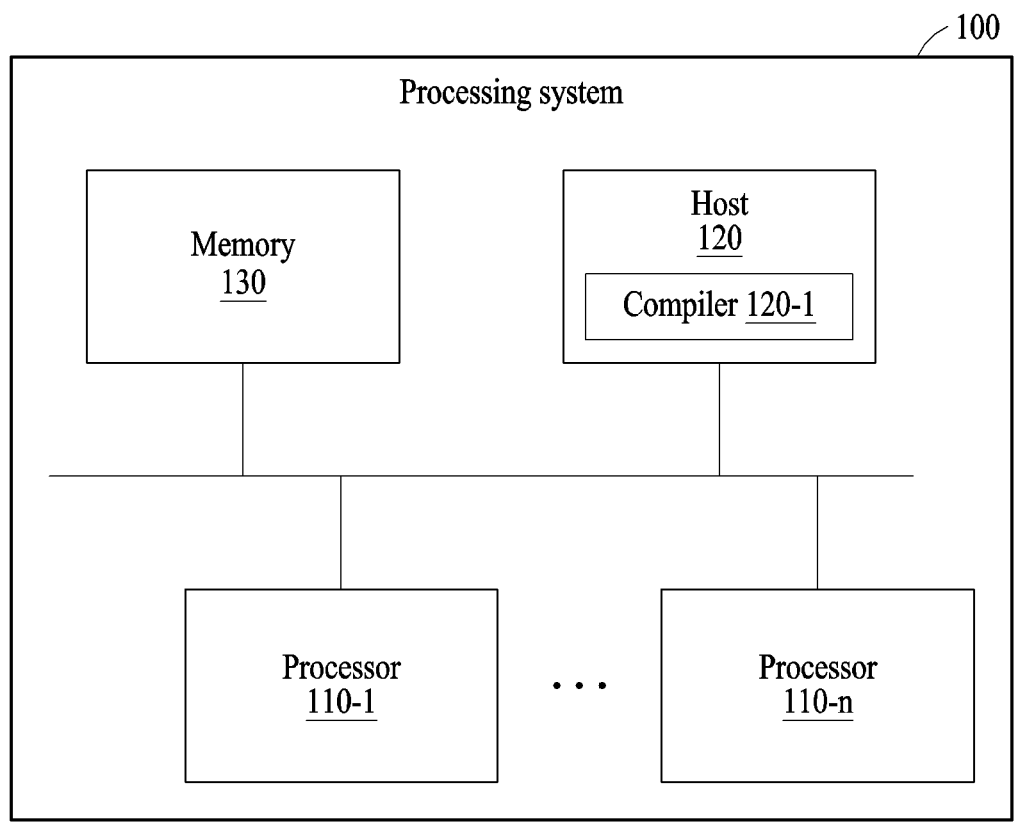
FIG. 1 illustrates an example processing system, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains after an understanding of the disclosure of the present application. Terms, such as those defined in commonly used dictionaries in the context of this art, are to be interpreted as having a meaning that is consistent with their meaning in the context of the relevant art and the disclosure of the present application, and are not to be interpreted in an idealized or overly formal sense unless expressly so defined herein.

FIG. 1 illustrates an example processing system, in accordance with one or more embodiments.

Referring to FIG. 1, a processing system 100 may include a plurality of processors (e.g., processors 110-1 to 110-n), a host 120 (i.e., host device), and a memory 130.

The processing system 100 may be, as a non-limiting example, an electronic device. In an example, the processing system 100 may be implemented as or in data centers and servers, but is not limited thereto. In an example, the processing system 100 may be implemented as or in a user terminal (e.g., a personal computer (PC), a smartphone, a laptop, a tablet PC, etc., as non-limiting examples).

The plurality of processors (e.g., the processors 110-1 to 110-n), the host 120, and the memory 130 may communicate with each other. In an example, the plurality of processors (e.g., the processors 110-1 to 110-n), the host 120, and the memory 130 may communicate with each other through a network on a chip (NoC), a peripheral component interconnect express (PCIe), or otherwise via a bus, as non-limiting examples.

In a non-limited example, the plurality of processors (e.g., the processors 110-1 to 110-n) may be implemented in a single chip or a single package. That is, the plurality of processors (e.g., the processors 110-1 to 110-n) may be included in a single integrated circuit, in an example. In an example, different portions of the processors 110-1 to 110-n may be included in respective different integrated circuits.

In an example, the plurality of processors (e.g., the processors 110-1 to 110-n) may perform parallel processing or may process multiple threads. A processing unit is a processing hardware that includes the plurality of processors (e.g., the processors 110-1 to 110-n), which may be representative of a parallel processing processor. As non-limiting examples, a manycore processor, a vector processor, a neural processing unit (NPU). a graphics processing unit (GPU), or a tensor processing unit (TPU) may include the plurality of processors (e.g., the processors 110-1 to 110-n). Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The plurality of processors (e.g., the processors 110-1 to 110-n) may dynamically adjust a data cache area and an instruction cache area when or while the multiple threads are processed.

The host 120 may be a processing device that controls an operation of components included in the processing system 100. In an example, the host 120 may include a central processing unit (CPU). In an example, the host 120 may further be representative of a compiler 120-1, and the compiler 120-1 may be configured to perform a compiling operation on an application to convert the application into a processable format (or an execution file executable by each of the processors 110-1 to 110-n) that may be processed by each of the processors 110-1 to 110-n.

In an example, memory 130 may be disposed separately to the processors 110-1 to 110-n and may be representative of an off-chip memory. The memory 130 may include dynamic random-access memory (DRAM), but is not limited thereto.

The memory 130 may store executable instructions to be executed by each of the processors 110-1 to 110-n and may store data (e.g., an operand). The instructions and data stored in the memory 130 may be transmitted or provided to the processors 110-1 to 110-n.

Figure 2:
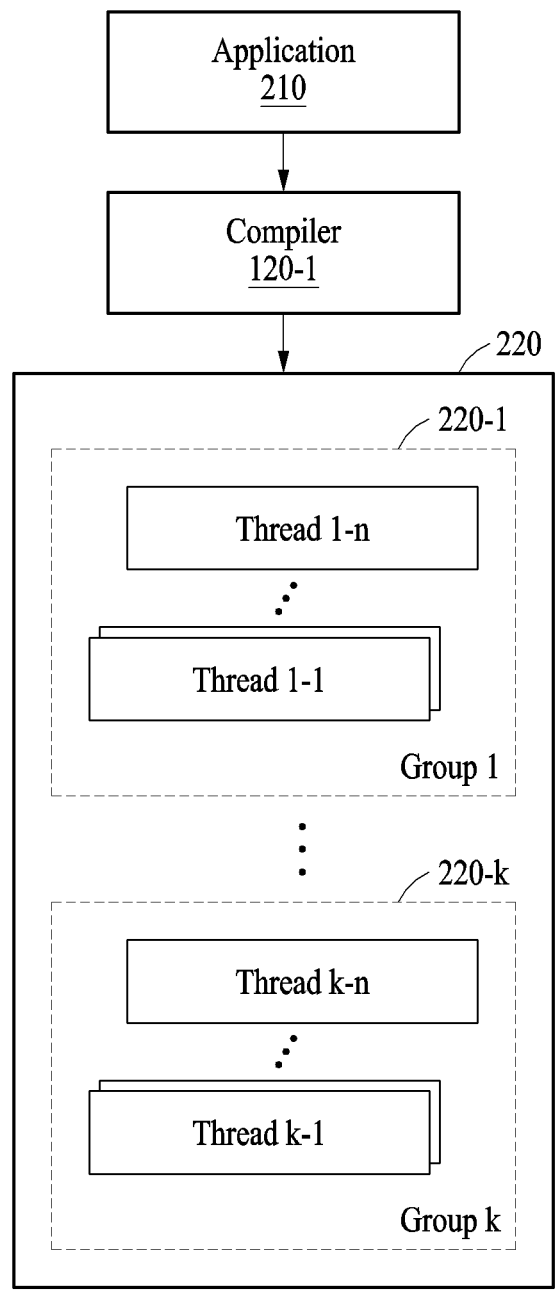
FIG. 2 illustrates an example operation of a compiler of a host in an example processing system, in accordance with one or more embodiments.

FIG. 2 illustrates an example operation of a compiler of a host in an example processing system, in accordance with one or more embodiments.

Referring to FIG. 2, the compiler 120-1 may generate a plurality of threads 220 by compiling an application 210.

In an example, the application 210 may be implemented in a parallel processing language. The parallel programming language may include, as non-limiting examples, compute unified device architecture (CUDA), open computing language (OpenCL), or open accelerators (OpenACC), but is not limited thereto.

In a non-limiting example, the plurality of threads 220 may use the same instructions.

Referring to FIG. 2, each of a plurality of groups 220-1 to 220-k of the threads 220, may be separated temporally. In an example, threads in each of the plurality of groups 220-1 to 220-k may be simultaneously processed spatially due to a limited amount of hardware (e.g., the processors 110-1 to 110-n). In an example, threads in group 1, 220-1, among the plurality of groups 220-1 to 220-k, may firstly be simultaneously processed by the processors 110-1 to 110-n. After the threads in the group 1 220-1 are processed, threads in a subsequent group, that is, in group 2, may be simultaneously processed by the processors 110-1 to 110-n. In FIG. 2, threads in group k 220-k may be finally processed.

The compiler 120-1 may generate control information to control each cache area (or cache control) of the processors 110-1 to 110-n by performing static analysis on the application 210. In an example, the analysis may include the compiler 120-1 identifying the total number and/or size of each instruction and variable in a first unit (e.g., a kernel, a loop, or a function) of each of the threads 220 through the static analysis. In an example, the compiler 120-1 may identify an instruction size and/or the total number of instructions in a loop (or a kernel, a function, etc.) of each thread in the group 1, 220-1, and may identify or predict the total number of variables in the loop (or a size of the data used in the loop). The compiler 120-1 may generate control information for each cache area controlled by the processors 110-1 to 110-n based on the identified result.

In the example illustrated in FIG. 2, the application 210 may include, as a non-limited example, a loop having 1,000 iterations. In an example, the loop may include one or more instructions. The compiler 120-1 may generate a thread corresponding to one performance of the loop from the application 210. In other words, the compiler 120-1 may generate 1,000 threads from the application 210. The compiler 120-1 may analyze the loop to identify the instruction size and/or the total number of instructions in the loop and may identify the total number of variables and/or a variable size. Since the total number of variables in the loop and/or the variable size may be related to data size, the compiler 120-1 may approximately identify or predict the data size used in the loop. The compiler 120-1 may transmit the control information including the identified instruction size and variable size (or data size) to the each of processors 120-1 to 120-n.

Each of the processors 110-1 to 110-n may generate a cache configuration to determine a cache area based on the received control information. In an example, the received control information may include an instruction size and a data size that may be identified by static analysis by the compiler 120-1. The processor 110-1 may determine first and second cache sizes based on each of the instruction size and data size in the received control information, and may generate a cache configuration 1-1 including the determined first and second cache sizes. In an example, the first cache size may be representative of an instruction cache size, and the second cache size may be representative of a data cache size. Similarly, each of the remaining processors may generate a cache configuration to determine a cache area.

Each of the processors 110-1 to 110-n may determine the first and second cache areas in a memory included in each of the processors 110-1 to 110-n based on each cache configuration. In a non-limited example, the first cache area may correspond to an instruction cache, and the second cache area may correspond to a data cache. In an example, the processor 110-1 may determine the first and second cache areas in a memory (e.g., static random-access memory (SRAM)) based on each of the first and second cache sizes in the cache configuration 1-1. Similarly, each of the remaining processors may determine the first and second cache areas in each of their respective memories based on each of the first and second cache sizes in each cache configuration of the respective memories.

In an example, a cache configuration generated by each of the processors 110-1 to 110-n may be the same. In such an example, a size of the first cache area in each memory of the processors 110-1 to 110-n may be the same. Additionally, a size of the second cache area in each memory of the processors 110-1 to 110-n may be the same. In another example, a cache configuration generated by each of the processors 110-1 to 110-n may be different due to a variation. In such an example, a size of the first cache area in each memory of the processors 110-1 to 110-n may be different from each other. Additionally, a size of the second cache area in each memory of the processors 110-1 to 110-n may be different from each other.

Each of the processors 110-1 to 110-n may cache one or more instructions to the first cache area and data to the second cache area. Each of the processors 110-1 to 110-n may process each thread based on the one or more cached instructions and cached data.

Each of the processors 110-1 to 110-n may generate a cache performance profile based on a result of processing a thread, may modify each cache configuration based on each cache performance profile, and may adjust a size of the first cache area and a size of the second cache area based on each modified cache configuration.

Each of the processors 110-1 to 110-n may adjust the size of the first cache area and the size of the second cache area when the thread is processed. In other words, each of the processors 110-1 to 110-n may actively adjust an instruction cache size and a data cache size when the thread is processed. Additionally, there may be relatively more load on the instruction cache than on the data cache, or relatively more load on the data cache than on the instruction cache based on characteristics of the application 210. Each of the processors 110-1 to 110-n may significantly increase a cache size in which a load occurs relatively frequently. Thus, the execution speed (or processing speed) of the application 210 and efficiency of using a cache may be improved.

Figure 3:
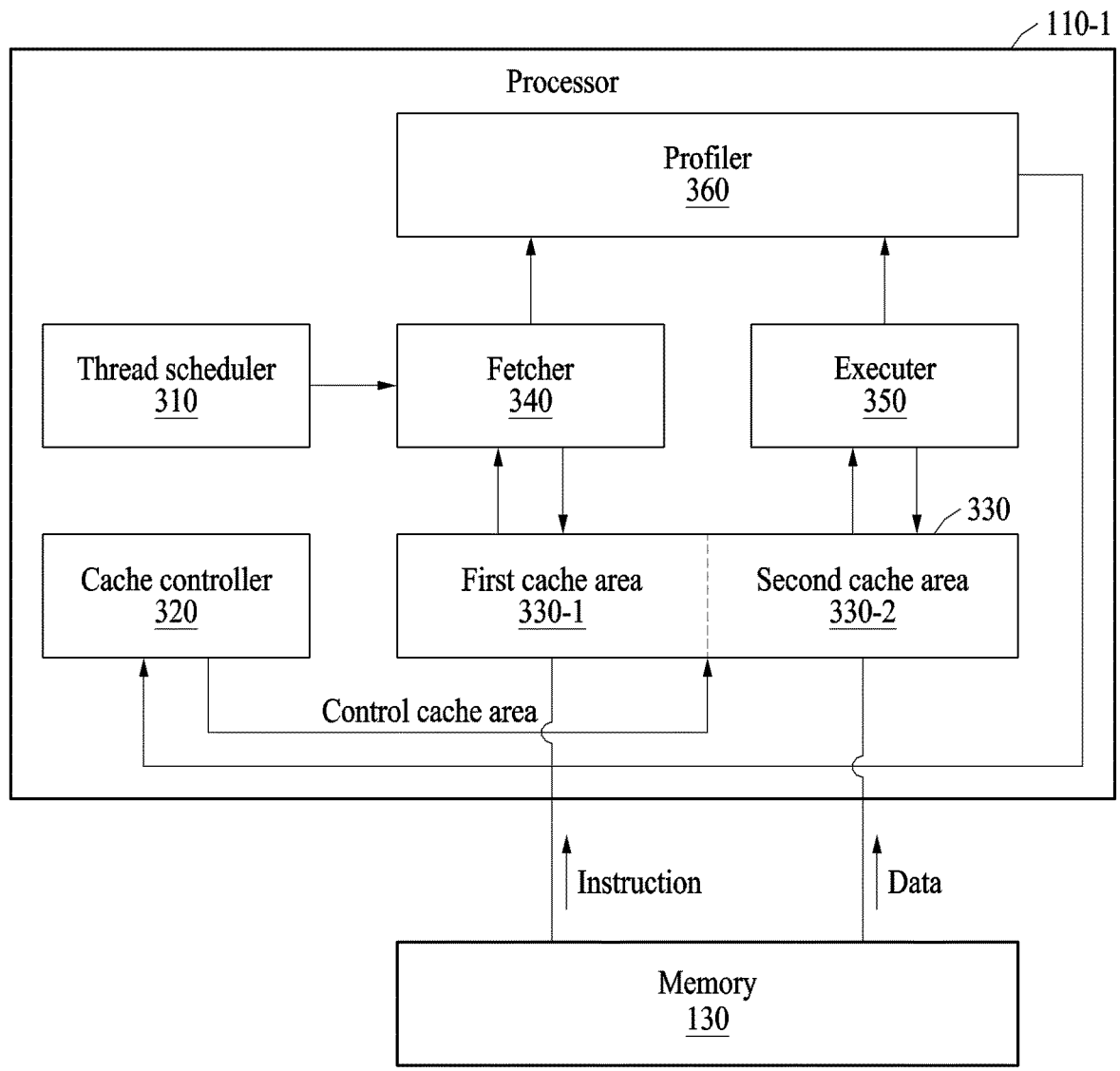
FIG. 3 illustrates an example processor, in accordance with one or more embodiments.

FIG. 3 illustrates an example processor, in accordance with one or more embodiments.

Referring to FIG. 3, an example processor 110-1 is illustrated. The description of the processor 110-1 may be applied to the remaining processors.

The processor 110-1 may include a thread scheduler 310, a cache controller 320, a memory 330, a fetcher 340, an executer 350, and a profiler 360. In an example, one or more or all of the thread scheduler 310, the cache controller 320, the fetcher 340, the executer 350, and the profiler 360 may be implemented as a circuit. The thread scheduler 310, the cache controller 320, the fetcher 340, the executer 350, and the profiler 360 may be representative of a thread scheduling circuit, a cache control circuit, a retrieving circuit, an execution circuit, and a profiling circuit, respectively.

As non-limiting examples, the executer 350 may be representative of an operation circuit (e.g., an arithmetic logic unit (ALU) circuit).

The thread scheduler 310 may perform scheduling on threads. In other words, the thread scheduler 310 may determine a schedule associated with an order in which the threads are processed. The processor 110-1 may process the threads based on the determined schedule.

The cache controller 320 may generate a cache configuration to determine a cache area of the memory 330, among the cache area 330-1 and the cache area 330-2, based on the control information received from the host 120 and/or a cache performance profile generated by the profiler 360.

The cache controller 320 may receive control information from the host 120. In an example, the control information may include an instruction size and a data size that the compiler 120-1 identified to be associated with the threads. The cache controller 320 may determine the first cache size based on the instruction size in the received control information, determine the second cache size based on the data size in the received control information, and generate the cache configuration 1-1 including the first and second cache sizes.

The cache controller 320 may determine (e.g., select) a first cache area 330-1 and a second cache area 330-2 in the memory 330 based on the cache configuration 1-1. The cache controller 320 may determine the first cache area 330-1 based on the first cache size in the memory 330, and may determine the second cache area 330-2 based on the second cache size in the memory 330.

The first cache area 330-1 may be implemented, or controlled, to cache an instruction stored in an external memory (e.g., the memory 130), and the second cache area 330-1 may be implemented, or controlled, to cache data stored in the memory 130.

The processor 110-1 may process the threads based on the cached instruction and cached data. In an example, the fetcher 340 may retrieve one or more instructions in the first cache area 330-1 and may decode the one or more fetched instructions. The execution unit 350 may execute the one or more decoded instructions. The executer 350 may load the data from the second cache area 330-2 based on the one or more decoded instructions and may perform an operation on the data. The executer 350 may store an operation result in the second cache area 330-2.

The processor 110-1 may generate a cache performance profile based on a result of processing the threads. In an example, the profiler 360 may collect information associated with a cache miss and/or a cache hit for the first cache area 330-1 from the fetcher 340 and may collect information associated with the cache miss and/or cache heat for the second cache area 330-2 from the executer 350. Additionally, the profiler 360 may identify the total number of first stalls (or first stall cycles) due to the cache miss for the first cache area 330-1 and may identify the total number of second stalls (or second stall cycles) due to the cache miss for the second cache area 330-2. A "stall" may refer to a total number of cycles during which a processor is delayed while waiting for a memory access. The profiler 360 may generate a cache performance profile for the first cache area 330-1 and the second cache area 330-2. The cache performance profile may include information associated with the cache miss and/or the cache hit for the first cache area 330-1, information associated with the cache miss and/or the cache hit for the second cache area 330-2, the total number of first stalls, and the total number of second stalls. The information associated with the cache miss for the first cache area 330-1 may include, as non-limiting examples, a cache miss rate for the first cache area 330-1 (hereinafter simply referred to as a "first cache miss rate") or the total number of cache misses for the first cache area 330-1 (hereinafter simply referred to as a "first cache miss count"). The information associated with the cache hit for the first cache area 330-1 may include, for example, a cache hit rate for the first cache area 330-1 (hereinafter simply referred to as a "first cache hit rate") or the total number of cache hits for the first cache area 330-1 (hereinafter referred to as a "first cache hit count"). The information associated with the cache miss for the second cache area 330-2 may include, for example, a cache miss rate for the second cache area 330-2 (hereinafter simply referred to as a "second cache miss rate") or the total number of cache misses for the second cache area 330-2 (hereinafter simply referred to as a "second cache miss count"). The information of a cache hit for the second cache area 330-1 may include, for example, a cache hit rate for the second cache area 330-2 (hereinafter simply referred to as a "second cache hit rate") or the total number of cache hits for the second cache area 330-2 (hereinafter simply referred to as a "second cache hit count"). The profiler 360 may transmit the cache performance profile to the cache controller 320.

In an example, the cache controller 320 may generate a second cache configuration 1-2 based on the cache performance profile and may control a cache area based on the second cache configuration 1-2. In other words, the cache controller 320 may generate the second cache configuration 1-2 by modifying the first cache configuration 1-1 based on the cache performance profile, and the cache configuration 1-2 may be applied to the first cache area 330-1 and the second cache area 330-2. In an example, the cache controller 320 may increase the first cache size when the first cache miss rate is greater than the second cache miss rate, decrease the second cache size, and generate the cache configuration 1-2 including the increased first cache size and the decreased second cache size. The cache controller 320 may increase the first cache area 330-1 based on the increased first cache size, and the second cache area 330-2 may be decreased based on the decreased second cache size.

The first cache area 330-1 may cache one or more instructions from the memory 130, and the second cache area 330-2 may cache data from the memory 130 such that a subsequent thread may be processed.

The processor 110-1 may process the threads based on the one or more instructions in the first cache area 330-1 and the data in the second cache area 330-2, and may generate a cache performance profile based on the result of processing the subsequent thread. The processor 110-1 may modify the cache configuration 1-2 based on the generated cache performance profile to generate a cache configuration 1-3, apply the cache configuration 1-3 to the first cache area 330-1 and the second cache area 330-2, and adjust the first cache area 330-1 and the second cache area 330-2. The processor 110-1 may adjust the instruction cache size and the data cache size when the threads are processed.

In an example, the processor 110-1 may generate a cache configuration by implementing only a cache performance profile. In such an example, the processor 110-1 may not receive control information from the host 210, and the cache configuration 1-1 described above may be predetermined. The processor 110-1 may determine the first cache area 330-1 and the second cache area 330-2 in the memory 330 based on the predetermined cache configuration 1-1 and may process threads. In an example, the predetermined cache configuration 1-1 may include the same first and second cache sizes. The cache controller 320 may determine the first cache area 330-1 and the second cache area 330-2 in the memory 330 based on the same first and second cache sizes. The profiler 360 may generate a cache performance profile based on a result of processing the threads, and the cache controller 320 may generate the cache configuration 1-2 based on a cache performance profile, and the first cache area 330-1 and the second cache area 330-2 may be adjected based on the generated cache configuration 1-2, as described above.

The description of the processor 110-1 may be applied to the remaining processors. Thus, descriptions of the remaining processors are omitted here for brevity.

Figure 4:
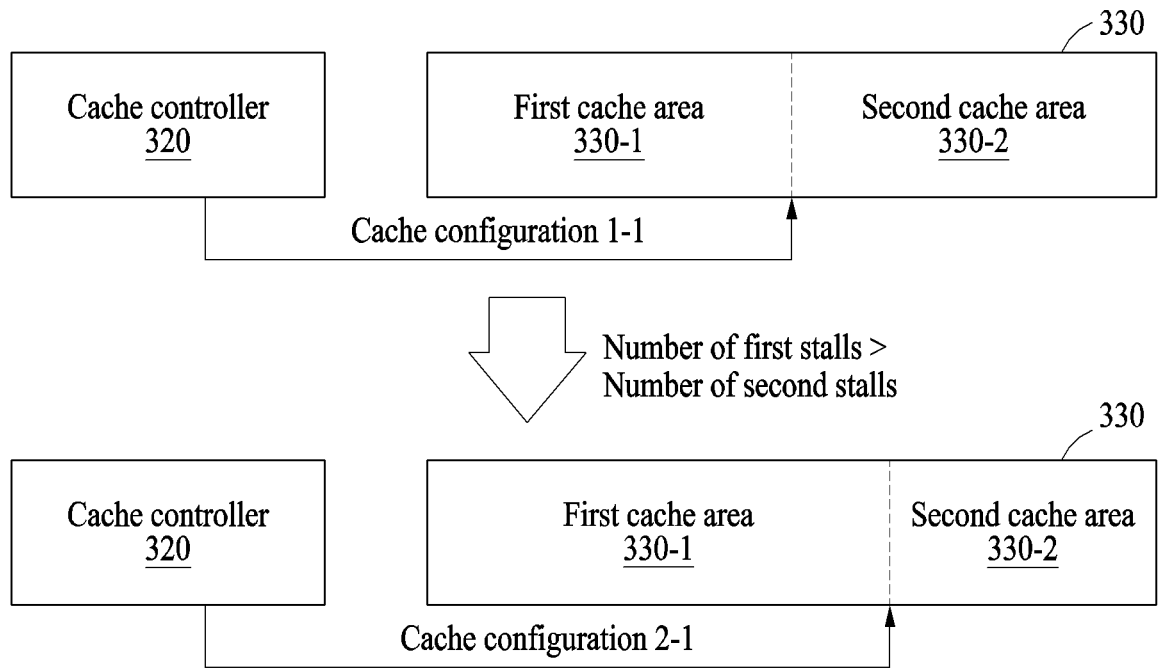
FIG. 4 illustrates an example processor adjusting a first cache area and a second cache area, in accordance with one or more embodiments.

FIG. 4 illustrates an example processor that determined or selects a first cache area and a second cache area, in accordance with one or more embodiments.

Referring to FIG. 4, the cache controller 320 may determine the first cache area 330-1 and the second cache area 330-2 based on the cache configuration 1-1.

The cache controller 320 may receive a cache performance profile from the profiler 360. In the example illustrated in FIG. 4, the cache controller 320 may identify whether the total number of first stalls of the first cache area 330-1 are greater than the total number of second stalls of the second cache area 330-2 based on the received cache performance profile. The total number of first stalls may be representative of the total number of cycle stalls due to a cache miss, during which a processor is delayed, for the first cache area 330-1, and the total number of second stalls may be representative of the total number of cycle stalls due to a cache miss, during which a processor is delayed, for the second cache area 330-2.

When the total number of first stalls are greater than the total number of second stalls, the cache controller 320 may increase a first cache size for the first cache area 330-1 such that the total number of first stalls and the total number of second stalls may balance each other and may decrease the second cache size. The cache controller 320 may generate a cache configuration 2-1 including the increased first cache size and the decreased second cache size.

In an example, the cache controller 320 may generate a cache configuration 2-1 based on control information received from the compiler 120-1 as well as the cache performance profile. In an example, the cache controller 320 may modify a first cache size for the first cache area 330-1 and a second cache size for the second cache area 330-2 based on the cache performance profile. In an example, the cache controller 320 may decrease the modified first cache size when the modified first cache size is greater than an instruction size in the control information, and when the modified second cache size is less than the data size in the control information, the modified second cache size may be increased. The cache controller 320 may increase the modified first cache size when the modified first cache size is less than the instruction size in the control information, and when the modified second cache size is greater than the data size in the control information, the modified second cache size may be decreased.

The cache controller 320 may apply the cache configuration 2-1 to the first cache area 330-1 and the second cache area 330-2 to increase the first cache area 330-1 and decrease the second cache area 330-2. In other words, the cache controller 320 may increase a cache area in which a stall occurs relatively more frequently in the instruction cache and the data cache and decrease a cache area in the instruction cache and the data cache in which a stall occurs relatively less frequently. The cache controller 320 may adjust the cache area in a direction that minimizes an effect of the stall.

Unlike the example illustrated in FIG. 4, when the total number of second stalls is greater than the total number of first stalls, the cache controller 320 may decrease the first cache size (for example the cache size of the first cache area 330-1) such that the total number of first stalls and the total number of second stalls may balance each other, thereby increasing the second cache size (for example, the cache size of the second cache area 330-2). In an example, the cache controller 320 may decrease the first cache area 330-1 based on the decreased first cache size and may increase the second cache area 330-2 based on the increased second cache size.

In an example, the cache controller 320 may adjust a cache area (for example, cache area 330-1 or cache area 330-2) based on a cache miss rate and/or a cache hit rate based on an implementation. In an example, when the cache controller 320 has a cache miss rate for the first cache area 330-1 (i.e., the first cache miss rate) that is greater than a cache miss rate for the second cache area 330-2 (i.e., the second cache miss rate), or has a cache miss rate for the first cache area 330-1 (i.e., the first cache miss rate) that is less than a cache miss rate for the second cache area 330-2 (i.e., the second cache miss rate), the first cache size may be increased and the second cache size may be decreased. The cache controller 320 may increase the first cache area 330-1 based on the increased first cache size, and the second cache area 330-2 may be decreased based on the decreased second cache size.

FIGS. 5A and 5B illustrate an example of determining an optimized cache size ratio by a processor, in accordance with one or more embodiments.

The processor 110-1 may generate a cache performance profile when each thread is processed, and may determine an optimized ratio between a size of the first cache area and a size of the second cache area based on the generated cache performance profile, and may apply the determined optimized ratio for determining (e.g., selecting) the first cache area 330-1 and the second cache area 330-2. A more detailed description is provided with reference to FIGS. 5A and 5B.

In an example, the processor 110-1 may record, as non-limiting examples, each cache configuration, a cache size ratio in each cache configuration, and items in each cache performance profile in a table and determine an optimized cache size ratio based on the table.

The cache size ratio in each cache configuration may be representative of a ratio between the first cache size of the first cache area 330-1 and the second cache size of the second cache area 330-2 in each cache configuration. The items in the cache performance profile may include, as non-limiting examples, the total number of first stalls of the first cache area 330-1, the total number of second stalls of the second cache area 330-2, a first cache miss rate, a second cache miss rate, a first cache hit rate, a second cache hit rate, a first cache miss count, a first cache hit count, a second cache miss count, a second cache hit count, and the like, but are not limited thereto.

Examples of tables are illustrated with reference to FIGS. 5A and 5B. However, the tables are not limited to the examples illustrated in FIGS. 5A and 5B.

Each cache configuration generated by the processor 110-1, the cache size ratio in each cache configuration, the total number of first stalls of a first cache area, and the total number of second stalls of a second cache area may be recorded in a table 510 illustrated in FIG. 5A. Each cache configuration generated by the processor 110-1, the cache size ratio in each cache configuration, the first cache miss rate (or the first cache hit rate), the second cache miss rate (or the second cache hit rate) may be recorded in a table 520 illustrated in FIG. 5B. In the table 520 illustrated in FIG. 5B, the cache miss counts (or the first cache hit counts) may be used instead of the first cache miss rate (or the first cache hit rate), and the second cache miss counts (or the second cache hit counts) may be used instead of the second cache miss rate (or the second cache hit rate).

In an example, the cache controller 320 may include a memory, and the table 510 or the table 520 may be stored in the memory of the cache controller 320.

In the examples illustrated in FIGS. 5A and 5B, the cache configuration 1-1 may be generated based on control information that the processor 110-1 received from the compiler 120-1. The cache configuration 2-1 may be generated by modifying a previous cache configuration (i.e., the cache configuration 1-1) by the processor 110-1. That is, the processor 110-1 may generate a cache performance profile based on a result of processing a thread 1-1 and may generate the cache configuration 2-1 by modifying the cache configuration 1-1 based on the generated cache performance profile. A thread 2-1 may be processed by adjusting a cache area through the cache configuration 2-1. Similarly, a cache configuration k-1 may be generated by modifying the previous cache configuration (i.e., cache configuration (k-1)-1) by the processor 110-1, and the processor 110-1 may process a thread k-1 by adjusting a cache area through the cache configuration k-1.

In the example illustrated in FIG. 5A, the cache controller 320 may record, in the table 510, the cache size ratio in an example of the cache configuration 1-1, the total number of first stalls, and the total number of second stalls generated when the thread 1-1 is being processed. The cache controller 320 may record, in the table 510, the cache size ratio in an example of the cache configuration 2-1, the total number of first stalls, and the total number of second stalls generated when the thread 2-1 is being processed. Similarly, the cache controller 320 may record, in the table 510, the cache size ratio in an example of a cache configuration k-1, the total number of first stalls, and the total number of second stalls generated when the thread k-1 is being processed.

The cache controller 320 may search for a cache size ratio having a lowest sum of the total number of first stalls and the total number of second stalls in the table 510. Such a cache size ratio may correspond to a determined optimized ratio between a size of the first cache area 330-1 and a size of the second cache area 330-2. The cache controller 320 may determine the first cache area 330-1 and the second cache area 330-2 in the memory 330 based on the found cache size ratio. In an example, although not illustrated in FIG. 5A, a sum of the total number of first stalls and the total number of second stalls may be lowest in an example of a cache configuration a-1. In such an example, the cache controller 320 may determine the first cache area 330-1 and the second cache area 330-2 in the memory 330 based on the cache size ratio in an example of the cache configuration a-1. When the first cache size is A and the second cache size is B in the cache configuration a-1, the cache controller 320 may determine the first cache area 330-1 having a size A in the memory 330 and the second cache area 330-2 having a size B. Similarly, each of the remaining processors may record or store a cache configuration, a cache size ratio, the total number of first stalls and total number of second stalls in the table 510. A determined optimized cache size ratio may be found in each table, and the first cache area and the second cache area may be determined based on the determined cache size ratio in the memory.

In the example illustrated in FIG. 5B, in an example of the cache configuration 1-1, the cache controller 320 may record, in the table 520, a cache size ratio, the first cache miss rate or ration (or the first cache hit rate or ratio), the second cache miss rate or ratio (or the second cache hit rate or ratio) when the thread 1-1 is being processed. In an example of the cache configuration 2-1, the cache controller 320 may record, in the table 520, the cache size ratio, the first cache miss rate or ratio (or the first cache hit rate or ratio), the second cache miss rate or ratio (or the second cache hit rate or ratio) when the thread 2-1 is being processed. Similarly, in an example of the cache configuration k-1, the cache controller 320 may record, in the table 520, the cache size ratio, the first cache miss rate or ratio (or the first cache hit rate or ratio), the second cache miss rate or ratio (or the second cache hit rate or ratio) when the thread k-1 is being processed.

The cache controller 320 may search for a cache size ratio that is a lowest sum of the first cache miss rate and the second cache miss rate (or a cache size ratio that is a sum of the first cache hit rate and the second cache hit rate) in the table 520. Such a cache size ratio may correspond to a determined optimized ratio between a size of the first cache area 330-1 and a size of the second cache area 330-2. The cache controller 320 may determine the first cache area 330-1 and the second cache area 330-2 in the memory 330 based on the found cache size ratio. Similarly, each of the remaining processors may record cache configurations, cache size ratios, first cache miss rates (or first cache hit rates), and second cache miss rates (or second cache hit rates) in the table 520. Each of the remaining processors may search for a determined optimized cache size ratio in each table and may determine the first cache area and the second cache area in a corresponding memory based on the found cache size ratio.

In an example, the host 120 may receive a second application that may be a same type of application as the application 210. The compiler 120-1 may compile the second application to generate a plurality of threads. Each memory of the processors 110-1 to 110-n may have a first cache area and a second cache area that is optimized to process threads of the application 210. Thus, the processors 110-1 to 110-n may process the threads of the second application more efficiently and at a faster rate.

Figure 6A:
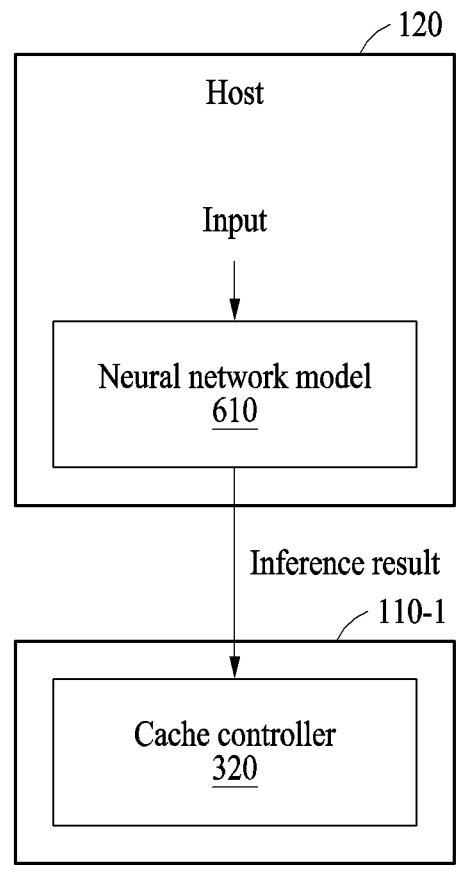
FIG. 6A and FIG. 6B illustrate an example of determining a first cache area and a second cache area using an inference result of a neural network model, in accordance with one or more embodiments.
Figure 6B:
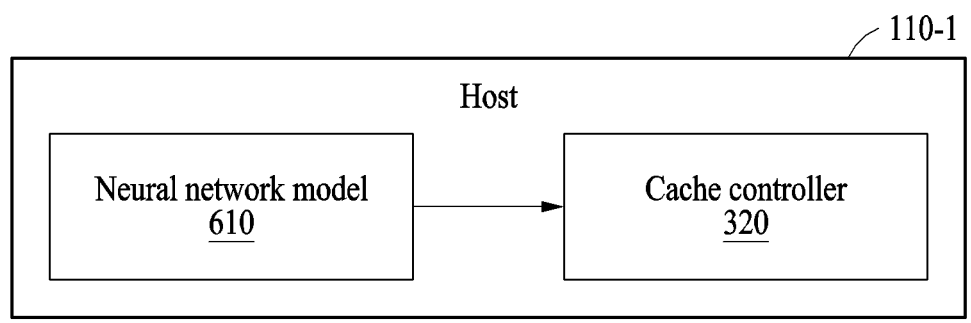

FIGS. 6A and 6B illustrate an example of determining a first cache area and a second cache area by implementing an inference result of a neural network model. A neural network may include one or more layers composed of one or more nodes. A neural network may be trained to infer a desired result from an arbitrary input by changing the weight of a node, e.g., until the neural network is trained. For example, the weights and biases of a layer structure or between layers may be collectively referred to as connectivity of a neural network. Accordingly, the training of a neural network may denote establishing and training of such weighted connectivities, while inference of the neural network may be operations or results of the neural network as trained.

Technological automation of recognition, classifying, or analyses, as non-limiting examples, has been implemented through processor implemented neural network models, as specialized computational architectures, that after substantial training may provide these computationally intuitive mappings between input patterns and output patterns, as non-limited examples. The trained capability of generating such mappings for trained purposes may be referred to as a learning capability of the neural network. Further, because of the specialized training, such specially trained neural network may thereby have a generalization capability of generating through inference a relatively accurate or reliable output with respect to an input pattern that the neural network may not have been trained for, for example.

Referring to FIG. 6A, the host 120 may include a neural network model 610.

As an example machine learning model, the neural network model 610 may be generated for the application 210. Although not illustrated in FIG. 6, a neural network model for other applications may be present in the host 120.

The neural network model 610 may be a model trained based on input data (e.g., data from the application 210). In an example, the neural network model 610 may be a model that is trained to predict an instruction size and a data size from the input data. In other words, the neural network model 610 may be a model that is trained to predict a performance for each of an instruction cache and a data cache from the input data.

The host 120 may transmit the data of the application 210 to the neural network model 610 when an execution request for the application 210 is made. The neural network model 610 may perform inference based on the transmitted data (or predict the performance of each of the instruction cache and the data cache). The host 120 may transmit control information including an inference result (or a performance prediction result) of the neural network model 610 (e.g., the instruction size and the data size predicted by the neural network model 610) to the processor 110-1. Similarly, the host 120 may transmit control information including the inference result of the neural network model 610 to each of the remaining processors.

The cache controller 320 may determine (e.g., select) a first cache size and a second cache size based on each of the instruction size and data size in the received control information, and may determine the first cache area 330-1 and the second cache area 330-2 based on each determined cache size.

In a non-limited example, the processors 110-1 to 110-n may each include the neural network model 610, and the host 120 may not include the neural network model 610. Hereinafter, referring to FIG. 6B, the processor 110-1 which includes the neural network model 610 is described. An operation of the processor 110-1 described with reference to FIG. 6B may be applied to each of the remaining processors.

In the example illustrated in FIG. 6B, the processor 110-1 may enter data (e.g., data of a thread) in the neural network model 610. The neural network model 610 may perform inference from input data (or predict a performance of each of the instruction cache and the data cache) and may transmit an inference result to the cache controller 320. The inference result of the neural network model 610 may include an instruction size and a data size predicted from the given data by the neural network model 610. The cache controller 320 may generate a cache configuration based on the inference result of the neural network model 610, and the first cache area 330-1 and the second cache area 330-2 may be determined by implementing the generated cache configuration, respectively. The neural network model 610 may be a model that is trained to generate a cache configuration from given data based on an implementation. The processor 110-1 may enter the data into the neural network model 610, and the neural network model 610 may generate a cache configuration by performing an inference based on the input data.

The cache controller 320 may respectively determine the first cache area 330-1 and the second cache area 330-2 based on a cache configuration.

The above description provided with reference to FIGS. 1 through 5B may also be applicable to the examples of FIGS. 6A and 6B. Thus, a more detailed description is omitted here for brevity.

Figure 7:
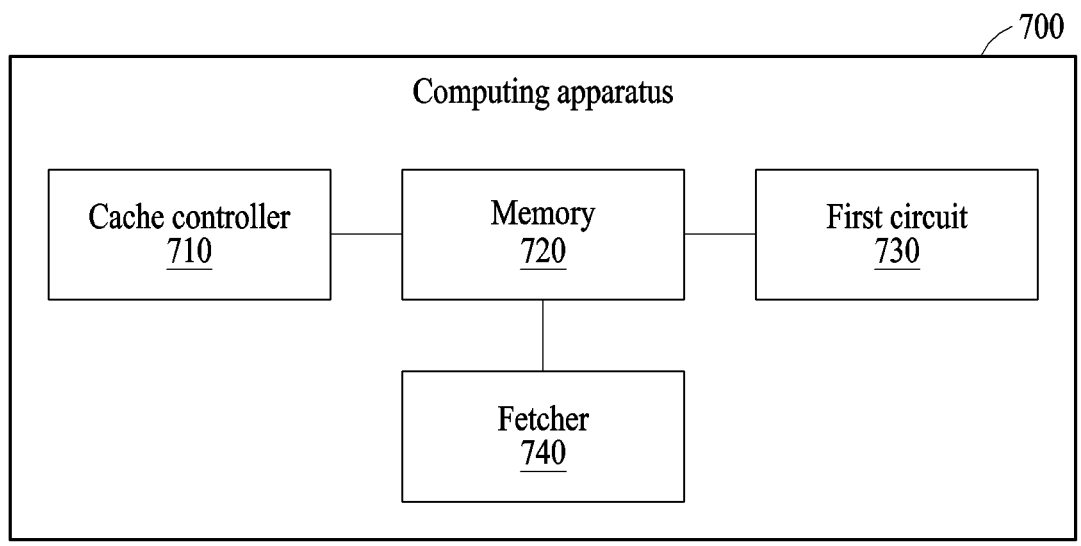
FIG. 7 illustrates an example computing apparatus, in accordance with one or more embodiments.

FIG. 7 illustrates an example computing apparatus, in accordance with one or more embodiments.

A description of an example computing apparatus 700 illustrated in FIG. 7 may correspond to the processor 110-1 described above.

The example computing apparatus 700 may include a cache controller 710, a memory 720, a first circuit 730, and a fetcher 740.

The cache controller 710 and the memory 720 may respectively correspond to the cache controller 320 and the memory 330 described above with regard to FIG. 3. The first circuit 730 and the fetcher 740 may correspond to the executer 350 and the fetcher 340 described above, respectively.

The cache controller 710 may receive control information for a cache area control from a host device (e.g., the host 120). The control information may include, as non-limiting examples, an instruction size and a data size (or a variable size) identified by the compiler 120-1 in the host device associated with the thread.

The cache controller 710 may generate a cache configuration (e.g., the cache configuration 1-1 described above) based on the received control information. The cache controller 710 may determine a first cache size and a second cache size based on the instruction size and data size, respectively.

The cache controller 710 may determine (e.g., select) a first cache area and a second cache area in the memory 720 based on the generated cache configuration. In other words, the cache controller 710 may determine an instruction cache area and a data cache area in the memory 720, and may use a first area of the memory 720 as the instruction cache and may use a second area of the memory 720 as the data cache.

The first cache area of the memory 720 may cache one or more instructions in an external memory (e.g., the memory 130 in FIG. 1), and the second cache area of the memory 720 may cache data received from an external memory.

The computing apparatus 700 may process a thread based on the one or more cached instructions and the cached data. In an example, the fetcher 740 may retrieve the one or more instructions in the first cache area and may decode the one or more retrieved instructions. The first circuit 730 may execute a decoded instruction. The first circuit 730 may import data from the second cache area and may process a thread by performing an operation on the imported data with the decoded instruction.

The computing apparatus 700 may further include the profiler 360, which may generate a cache performance profile based on a result of processing the thread. The cache controller 710 may modify the cache configuration based on the cache performance profile, and the modified cache configuration may be applied to the first cache area and the second cache area to dynamically adjust the first cache area and the second cache area.

In an example, the cache controller 710 may determine an optimized ratio between a size of the first cache area and a size of the second cache area based on the cache performance profile generated each time when each thread is being processed, and the determined optimized ratio may be applied to the first cache area and the second cache area.

The description provided with reference to FIGS. 1 to 6 also applies to the description of FIG. 7, and thus a more detailed description is omitted here for brevity.

Figure 8:
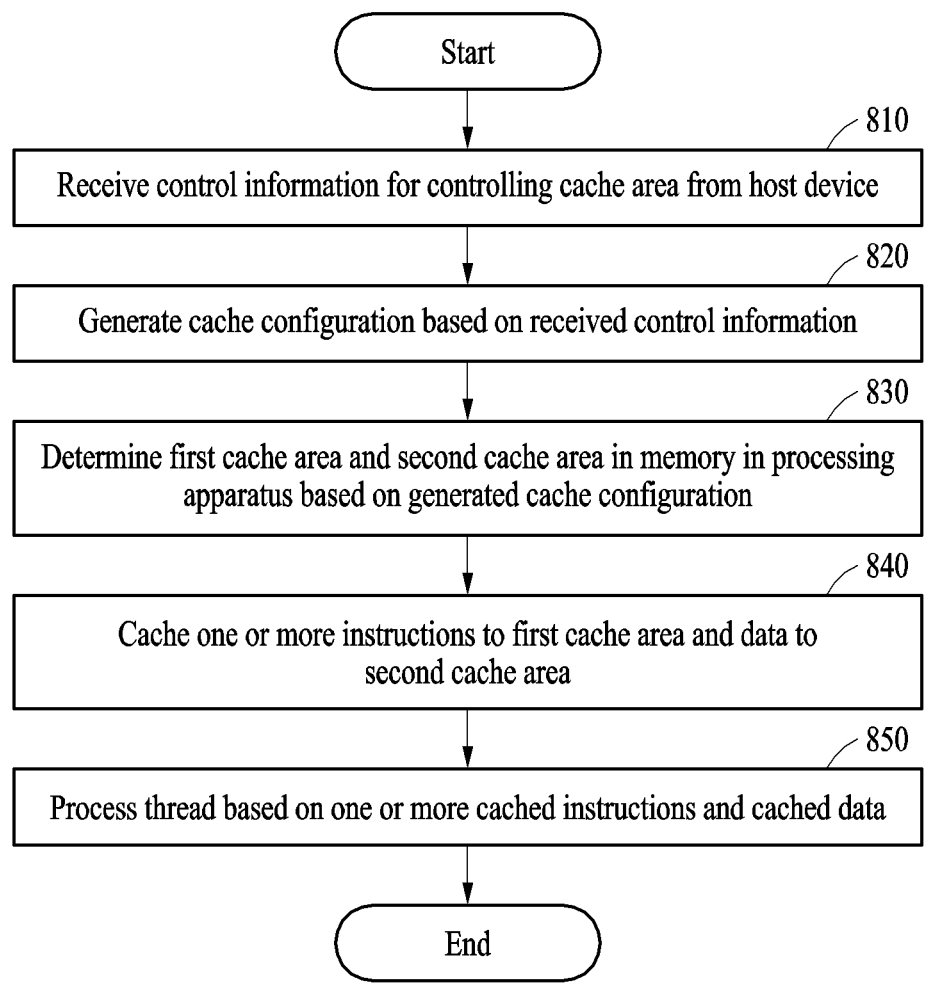
FIG. 8 illustrates an example method of operating an example computing apparatus, in accordance with one or more embodiments.

FIG. 8 illustrates an example method, in accordance with one or more embodiments. The operations in FIG. 8 may be performed in the sequence and manner as shown. However, the order of some operations may be changed, or some of the operations may be omitted, without departing from the spirit and scope of the shown example. Additionally, operations illustrated in FIG. 8 may be performed in parallel or simultaneously. One or more blocks of FIG. 8, and combinations of the blocks, can be implemented by special purpose hardware-based computer that perform the specified functions, or combinations of special purpose hardware and instructions, e.g., computer or processor instructions. In addition to the description of FIG. 8 below, the descriptions of FIGS. 1-7 are also applicable to FIG. 8, and are incorporated herein by reference. Thus, the above description may not be repeated here for brevity purposes. The operations of FIG. 8 may be performed by a processor of the processing system.

Referring to FIG. 8, in operation 810, the computing apparatus 700, e.g., the computing apparatus of FIG. 7, as a non-limiting example, may receive control information for a cache area control from a host device. The computing apparatus 700 may receive an instruction size and a data size inferred from a given input (e.g., data of the application 210) that the neural network model 610 in the host device received as the control information.

In operation 820, the computing apparatus may generate a cache configuration based on the received control information. The computing apparatus may determine, e.g., select, a first cache size based on the instruction size in the received control information and may determine a second cache size based on the data size in the received control information. The computing apparatus may generate a cache configuration including the determined first cache size and the determined second cache size.

In operation 830, the computing apparatus may determine the first cache area and the second cache area in the memory 720 based on the generated cache configuration.

In operation 840, the computing apparatus may cache one or more instructions in the first cache area and may cache data in the second cache area.

In operation 850, the computing apparatus may process a thread based on the one or more cached instructions and the cached data.

In an example, the computing apparatus may generate a cache performance profile based on a result of processing the thread. The cache performance profile may include the total number of first stalls due to a cache miss of the first cache area and the total number of second stalls due to a cache miss of the second cache area. Additionally, the cache performance profile may include a cache miss rate and/or cache hit rate of each of the first and second cache areas.

The computing apparatus may modify the cache configuration based on the generated cache performance profile. The computing apparatus may modify the first cache size and the second cache size such that the total number of first stalls and the total number of second stalls balance each other. In an example, the computing apparatus may increase the first cache size and decrease the second cache size when the total number of first stalls is more than the total number of second stalls. The computing apparatus may increase the second cache size and decrease the first cache size when the total number of second stalls is more than the total number of first stalls.

The computing apparatus may apply the modified cache configuration to the first cache area and the second cache area. The computing apparatus may adjust the first cache area based on the modified first cache size, and may adjust the second cache area based on the modified second cache size. A cache area in which a stall occurs relatively more frequently or a cache miss rate that is relatively high may be increased, and other cache areas may be decreased.

Figure 9:
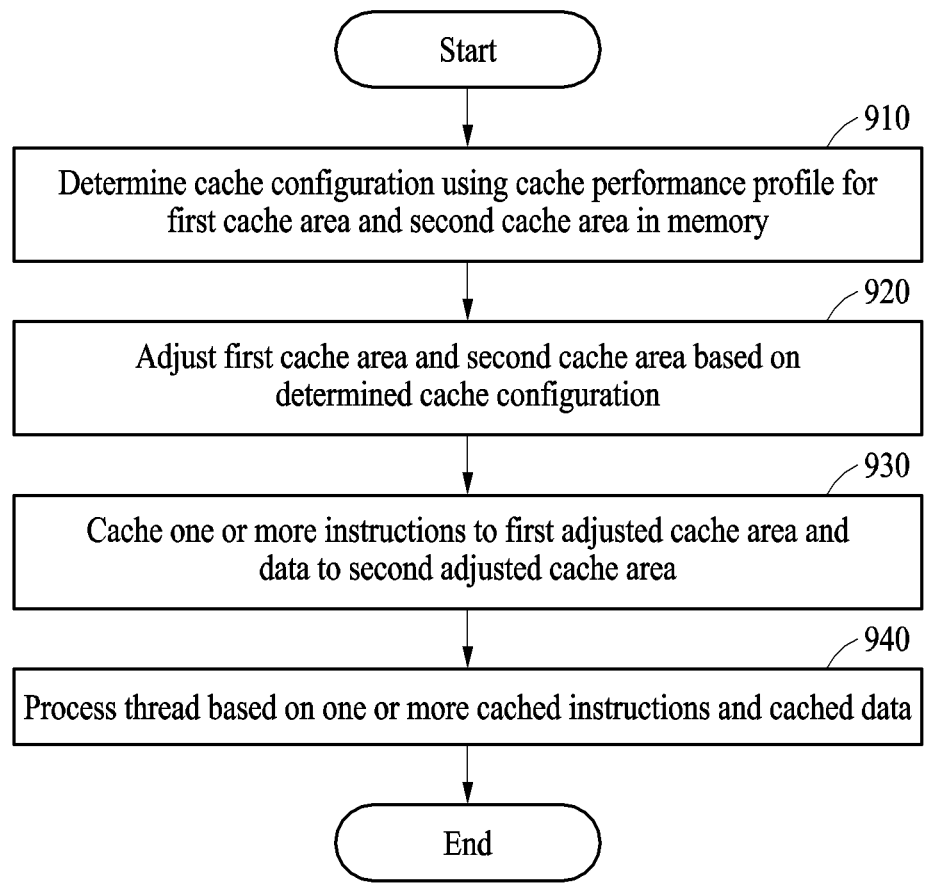
FIG. 9 illustrates an example method of operating an example computing apparatus, in accordance with one or more embodiments.

FIG. 9 illustrates an example method, in accordance with one or more embodiments. The operations in FIG. 9 may be performed in the sequence and manner as shown. However, the order of some operations may be changed, or some of the operations may be omitted, without departing from the spirit and scope of the shown example. Additionally, operations illustrated in FIG. 9 may be performed in parallel or simultaneously. One or more blocks of FIG. 9, and combinations of the blocks, can be implemented by special purpose hardware-based computer that perform the specified functions, or combinations of special purpose hardware and instructions, e.g., computer or processor instructions. In addition to the description of FIG. 9 below, the descriptions of FIGS. 1-8 are also applicable to FIG. 9, and are incorporated herein by reference. Thus, the above description may not be repeated here for brevity purposes. The operations of FIG. 9 may be performed by a processor of any processing system, e.g., a computing apparatus or an electronic apparatus described herein.

Referring to FIG. 9, in operation 910, the computing apparatus, e.g., a smart phone, a personal computer, and an electronic device as non-limiting examples, may determine a cache configuration based on a cache performance profile for a first cache area and a second cache area disposed in the memory 720.

In operation 920, the computing apparatus may adjust or select sizes or areas for a first cache area and a second cache area based on the determined cache configuration.

In operation 930, the computing apparatus may cache one or more instructions in the adjusted first cache area and may cache the data in the adjusted second cache area.

In operation 940, the computing apparatus 700 may process a thread based on the one or more cached instructions and cached data.

The computing apparatus may generate a different cache performance profile based on a result of processing the thread in operation 940. The computing apparatus may change the determined cache configuration in operation 910 using another generated cache performance profile. In one or more examples, the computing apparatus may modify a size of the first cache area and a size of the second cache area to balance the total number of first stalls due to a cache miss of the adjusted first cache area and the total number of second stalls due to a cache miss of the adjusted second cache area. The computing apparatus may apply the modified cache configuration to the first cache area and the second cache area.

Figure 10:
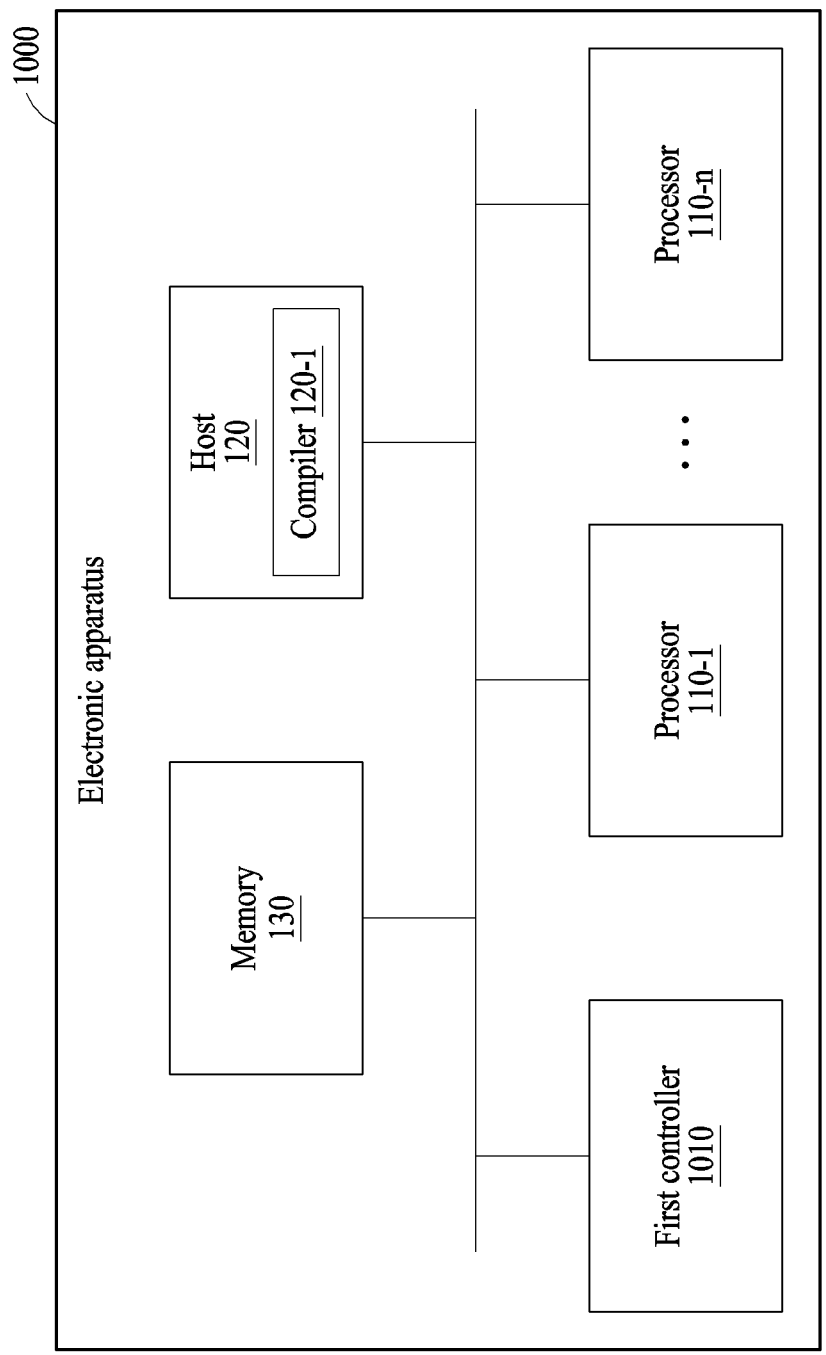
FIG. 10 illustrates an example electronic apparatus, in accordance with one or more embodiments.

FIG. 10 illustrates an example electronic apparatus, in accordance with one or more embodiments.

Referring to FIG. 10, an electronic apparatus 1000 may include the processors 110-1 to **110-*n*, the host 120, compiler 120-1, the memory 130, and a first controller 1010**.

In a non-limited example, the electronic apparatus 1000 may be, implemented in, a data center and a server, but is not limited thereto, and the electronic apparatus 1000 may be implemented as or in a user terminal (e.g., a PC, a smart-phone, a laptop, a tablet PC, etc.).

The processors 110-1 to **110-*n* and the first controller 1010 of FIG. 10 may be implemented as, or in, a single chip or a single package, as a non-limiting example. For example, the processors 110-1 to 110-***n* and the first controller 1010 may be included in a single integrated circuit.

In the example illustrated in FIG. 10, the host 120 may not transmit control information generated by the compiler 120-1 to the processors 110-1 to 110-*n*. Instead, the control information may be transmitted to the first controller 1010. The first controller 1010 may then generate each cache configuration in the processors 110-1 to 110-*n* based on the control information, and/or each cache performance profile in the processors 110-1 to 110-*n*, instead of each cache controller in the processors 110-1 to 110-*n* generating the cache configuration. Each cache controller of the processors 110-1 to 110-*n* may receive a cache configuration from the first controller 1010 and may determine, e.g., select, the first cache area and the second cache area in each memory based on each cache configuration.

The first controller 1010 may receive control information from the host 120, and may generate each cache configuration in the processors 110-1 to 110-*n* based on the received control information. In an example, the first controller 1010 may generate the cache configuration 1-1 of the processor 110-1 based on the received control information and may generate a cache configuration of the processor 110-*n* based on the received control information 1-*n*. Similarly, the first controller 1010 may generate a cache configuration for each of the remaining processors based on the control information.

Each cache controller in the processors 110-1 to 110-*n* may receive a cache configuration from the first controller 1010. In an example, the cache controller 320 of the processor 110-1 may receive the cache configuration 1-1 from the first controller 1010, and a cache controller of the processor 110-*n* may receive a cache configuration 1-n from the first controller 1010. Similarly, each cache controller in the remaining processors may receive a cache configuration from the first controller 1010.

In an example, each cache controller in the processors 110-1 to 110-*n* may determine the first cache area and the second cache area in each memory based on each of the received cache configurations.

The processors 110-1 to 110-*n* may process threads (e.g., each of the threads in the group 1 220-1 in FIG. 2) to generate a cache performance profile based on a result of processing each thread and may transmit each cache performance profile to the first controller 1010.

The first controller 1010 may modify each cache configuration of the processors 110-1 to 110-*n* based on each cache performance profile received from the processors 110-1 to 110-*n* and/or generated control information by the compiler 120-1 to generate a cache configuration for processing subsequent threads in the processors 110-1 to 110-*n* and may transmit each generated cache configuration to the processors 110-1 to 110-*n*. In an example, the first controller 1010 may modify the cache configuration 1-1 based on the cache performance profile and/or the control information generated by the compiler 120-1, received from the processor 110-1, to generate a cache configuration 1-2 to process a subsequent thread, and may transmit the cache configuration 1-2 to the processor 110-1. Similarly, the first controller 1010 may generate a cache configuration for the subsequent thread for processing by each of the remaining processors and transmit the generated cache configuration to each cache controller in the remaining processors.

In an example, the first controller 1010 may record each cache configuration of the processors 110-1 to 110-*n* in a table. Table 1 below illustrates an example table recorded by the first controller 1010.

TABLE 1

| 1. | Processor 110-1 | 2. | Cache configuration 1-1 | 3. | Cache configuration 2-1 | 4. | ... |
|---|---|---|---|---|---|---|---|
| 5. | ... | 6. | ... | 7. | ... | 8. | ... |
| 9. | Processor 110-n | 10. | Cache configuration 1-n | 11. | Cache configuration 2-n | 12. | ... |

The first controller 1010 may record the cache performance profile in each of the processors 110-1 to 110-*n* in Table 1 above or may record the cache performance profile in each cache configuration in the processors 110-1 to 110-*n* in a separate table based on an implementation.

When the processors 110-1 to 110-*n* complete the processing of the threads 220, the first controller 1010 may determine an optimized cache configuration based on the cache performance profile in each cache configuration recorded in Table 1 above. The first controller 1010 may transmit the determined cache configuration to each of the processors 110-1 to 110-*n*, and each cache controller in the processors 110-1 to 110-*n* may determine the first cache area and the second cache area in each memory based on the determined cache configuration.

In an example, the first controller 1010 may generate various cache configurations per thread (or per processor) based on the control information generated by the compiler 120-1 and/or each cache performance profile of the processors 110-1 to 110-*n*. In an example, the first controller 1010 may generate the cache configuration 1-1 to cache configuration 1-n differently based on the control information generated by the compiler 120-1. The first controller 1010 may differently generate the cache configuration 2-1 to a cache configuration 2-n based on the generated control information by the compiler 120-1 and/or a cache performance profile in each cache configuration 1-1 to a cache configuration 1-n. The processors 110-1 to 110-*n* may have different cache configurations applied such that threads are processed, and thus the first controller 1010 may search for a determined optimized cache configuration faster.

The description provided with reference to FIGS. 1 to 9 also applies to the description of FIG. 10, and thus a repeated detailed description is omitted here for brevity.

The processing system 100, memory 130, host 120, processors 110-1 to 110-*n*, thread scheduler 310, cache controller 320, profiler 360, retrieving device 340, executer 350, memory 330, computing apparatus 700, cache controller 710, memory 720, first circuit 730, retrieving device 740, and first controller 1010, electronic apparatus 1000, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-10, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:
1. A method implemented by a processor, the method comprising:

receiving control information for controlling sizing of a cache area from a host device, wherein the control information comprises a data size and an instruction size corresponding to a thread as determined by a compiler while compiling code;

generating a cache configuration based on the received control information;

setting a size of an instruction cache area and a size of a data cache area in a memory in the processor based on the generated cache configuration;

caching some of the instructions of the thread stored in an external memory of the processor to the instruction cache area and caching data of the thread stored in the external memory to the data cache area;

monitoring usage, by execution of the thread, of the cached instructions and the cached data;

generating a cache performance profile based on a result of the monitoring;

modifying the generated cache configuration based on the generated cache performance profile; and based on the modified cache configuration, changing the size of the instruction cache area and the size of the data cache area.

2. The method of claim 1, wherein the generating of the cache configuration is performed upon execution of the thread.

3. The method of claim 2, wherein the monitoring the usage of the cached instructions and the cached data comprises monitoring stalls.

4. The method of claim 1, wherein the monitoring comprises determining a total number of first stalls due to cache misses of the instruction cache and determining a total number of second stalls due to cache misses, and wherein the modifying of the generated cache configuration comprises modifying the size of the instruction cache area and modifying the size of the data cache area such that a total number of the first stalls and a total number of second stalls are balanced.

5. The method of claim 4, wherein the modifying of the size of the instruction cache area and the modifying of the size of the data cache area comprises:

increasing the size of the instruction cache area and decreasing the size of the data cache area in response to the total number of first stalls being greater than the total number of second stalls; and increasing the size of the data cache area size and decreasing the size of the instruction cache area in response to the total number of second stalls being greater than the total number of first stalls.

6. The method of claim 1, further comprising:

determining an optimized ratio between the size of instruction cache area and the size of the data cache area based on the generated cache performance profile; and setting the size of the instruction cache area and the size of the data cache area according to the determined optimized ratio.

7. The method of claim 1, wherein the received instruction size and data size are inferred from an input given by a neural network model in the host device.

8. The method of claim 1, wherein the memory comprises static random-access memory (SRAM).

9. A computing apparatus, comprising:

a memory;

a cache controller configured to: receive control information for controlling a cache area from a host device, generate a cache configuration based on the control information, and determine a size of an instruction cache area and a size of a data cache area in the memory based on the generated cache configuration, wherein the control information comprises a data size and an instruction size corresponding to a thread as determined by a compiler while compiling code;

a fetcher configured to fetch instructions cached in the instruction cache area and decode the fetched instructions;

an arithmetic logic unit configured to perform operations on the cached data in the data cache area and process the thread based on the decoded instructions; and a profiler configured to generate a cache performance profile based on a result of monitoring performance of the instruction cache area and the data cache area with respect to the operations of processing the thread, the cache performance profile indicating efficiency of use of the instruction cache area and the data cache area, wherein the cache controller is configured to modify the generated cache configuration based on the generated cache performance profile, and, according to the modified cache configuration, update the size of the instruction cache area and the size of the data cache area.

10. The apparatus of claim 9, wherein the cache controller is configured to modify the size of the instruction cache area and the size of the data cache area such that a total number of first stalls due to cache misses of the instruction cache area and a total number of second stalls due to cache misses of the data cache area are balanced.

11. The apparatus of claim 10, wherein the cache controller is configured to:

increase the size of the instruction cache area and decrease the size of the data cache area in response to the total number of first stalls being greater than the total number of second stalls, and increase the size the data cache area and decrease size of the instruction cache area in response to the total number of second stalls being greater than the total number of first stalls.

12. The apparatus of claim 9, wherein the cache controller is configured to determine an optimized ratio between the size of the instruction cache area and the size of the data cache area based on the generated cache performance profile and apply the determined optimized ratio to the instruction cache area and the data cache area.

13. The apparatus of claim 9, wherein the instruction size and the data size are inferred from an input given by a neural network model in the host device.

14. The apparatus of claim 9, wherein the memory comprises static random-access memory (SRAM).

15. An electronic apparatus comprising:

a plurality of processors, each processor comprising a respective memory; and wherein each of the processors is configured to:

receive control information for controlling a cache area from a host device, the control information comprising a data size and an instruction size corresponding to a thread, the thread being determined by a compiler while compiling code, generate a cache configuration based on the control information, determine a size of an instruction cache area and a size of a data cache area in the memory of the corresponding processor based on the generated cache configuration, cache instructions of the thread to the instruction cache area and cache data of the thread to the data cache area, process the thread based on the one or more cached instructions and the cached data, monitor usage of the cached instructions and the cached data;

determine a performance of the instruction cache area and the data cache area based on a result of the monitoring, the performance corresponding to the processing of the thread, and based on the performance of the instruction cache area and the data cache area, update the cache configuration, and update the size of the instruction cache area and the size of the data cache area based on the updated cache configuration.

\* \* \* \* \*